(12) United States Patent
Reil et al.

(10) Patent No.: US 10,097,370 B2
(45) Date of Patent: Oct. 9, 2018

(54) METHOD AND SYSTEM FOR PROGRAMMING A SENSOR NETWORK

(71) Applicant: Continental Automotive GmbH, Hannover (DE)

(72) Inventors: Frank Reil, Regensburg (DE); Juergen Bock, Bad Abbach (DE); Peter Weiterer, Regensburg (DE); Karsten Koehler, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 15/304,784

(22) PCT Filed: Jul. 31, 2015

(86) PCT No.: PCT/EP2015/067643
§ 371 (c)(1),
(2) Date: Oct. 17, 2016

(87) PCT Pub. No.: WO2016/020279
PCT Pub. Date: Feb. 11, 2016

(65) Prior Publication Data
US 2017/0201390 A1 Jul. 13, 2017

(30) Foreign Application Priority Data
Aug. 6, 2014 (DE) .......... 10 2014 215 580

(51) Int. Cl.
*H04L 12/40* (2006.01)
*H04L 29/08* (2006.01)
(Continued)

(52) U.S. Cl.
CPC ........ *H04L 12/40169* (2013.01); *H04L 67/12* (2013.01); *H04L 67/34* (2013.01);
(Continued)

(58) Field of Classification Search
CPC .............. H04L 12/40169; H04L 67/34; H04L 2012/40273
(Continued)

(56) References Cited

U.S. PATENT DOCUMENTS 6,963,781 B2  11/2005  Fehrer et al. ................... 700/19
9,178,760 B2  11/2015  Lessmann et al.
(Continued)

FOREIGN PATENT DOCUMENTS

CN  102023062 A  4/2011  ............. G01K 17/08
CN  102419191 A  4/2012  ............. G01D 18/00
(Continued)

OTHER PUBLICATIONS

German Office Action, Application No. 102014215580.0, 5 pages, dated Jan. 27, 2015.
(Continued)

*Primary Examiner* — Jae Y Lee
*Assistant Examiner* — Jean F Voltaire
(74) *Attorney, Agent, or Firm* — Slayden Grubert Beard PLLC

(57) ABSTRACT

The present disclosure may be embodied in a method for programming a sensor network having a plurality of sensors including: providing a first association between a first parameter and a second parameter, wherein the first parameter represents a sensor identification and the second parameter represents an installation location or a system function of the respective sensor; providing a second association between the second parameter and a third parameter representing prescribed operating data for the respective sensor; ascertaining a third association on the basis of the first association and the second association, the third association
(Continued)

between the first parameter and the third parameter, and programming the plurality of sensors on the basis of the third association.

9 Claims, 1 Drawing Sheet

(51) Int. Cl.
    *H04W 12/12*     (2009.01)
    *H04W 84/04*     (2009.01)
    *H04W 84/18*     (2009.01)
    *H04W 76/14*     (2018.01)

(52) U.S. Cl.
    CPC ... *H04L 2012/40273* (2013.01); *H04W 12/12* (2013.01); *H04W 76/14* (2018.02); *H04W 84/047* (2013.01); *H04W 84/18* (2013.01)

(58) Field of Classification Search
    USPC .......................................................... 370/257
    See application file for complete search history.

(56) References Cited

U.S. PATENT DOCUMENTS

| | | | |
|---|---|---|---|
| 2009/0083465 A1 | 3/2009 | Schaetzle et al. ............ | 710/110 |
| 2010/0211594 A1* | 8/2010 | Penders .............. | G06F 19/3418 |
| | | | 707/769 |
| 2010/0286944 A1 | 11/2010 | Reihlen et al. ............... | 702/122 |
| 2011/0231533 A1* | 9/2011 | Ewing .................... | G01D 21/00 |
| | | | 709/221 |
| 2012/0026016 A1* | 2/2012 | Mitchell ............... | G06Q 10/06 |
| | | | 340/945 |
| 2012/0036493 A1* | 2/2012 | Moosmann ............. | G05B 9/03 |
| | | | 717/105 |
| 2012/0079149 A1 | 3/2012 | Gelvin et al. ................. | 710/107 |
| 2013/0061456 A1 | 3/2013 | Lefaure et al. ................. | 29/595 |
| 2013/0078906 A1* | 3/2013 | Ben Hamida .......... | H04B 17/02 |
| | | | 455/7 |
| 2013/0126595 A1* | 5/2013 | Ashford ............ | G05B 19/0426 |
| | | | 235/375 |
| 2014/0165026 A1 | 6/2014 | Mcintyre et al. ............. | 717/100 |
| 2015/0006548 A1* | 1/2015 | Huang ............. | G06F 17/30345 |
| | | | 707/749 |

FOREIGN PATENT DOCUMENTS

| | | | | |
|---|---|---|---|---|
| DE | 10243781 A1 | 3/2004 | .......... | G05B 19/042 |
| DE | 602005002585 T2 | 6/2008 | ............. | G05B 19/00 |
| DE | 102009002708 A1 | 11/2010 | ............. | B60R 16/02 |
| DE | 102010048588 A1 | 4/2012 | ............. | H04L 12/24 |
| EP | 2645190 A2 | 10/2013 | ........... | G05B 19/042 |
| WO | 2016/020279 A1 | 2/2016 | ........... | G05B 19/042 |

OTHER PUBLICATIONS

International Search Report and Written Opinion, Application No. PCT/EP2015/067643, 13 pages, dated Oct. 7, 2015.
Chinese Office Action, Application No. 201580011926.3, 7 pages, dated Feb. 1, 2018.

* cited by examiner

METHOD AND SYSTEM FOR PROGRAMMING A SENSOR NETWORK

CROSS-REFERENCE TO RELATED APPLICATIONS

This application is a U.S. National Stage application of International Application No. PCT/EP2015/067643 filed Jul. 31, 2015, which designates the United States of America, and claims priority to DE Application No. 10 2014 215 580.0 filed Aug. 6, 2014, the contents of which are hereby incorporated by reference in their entirety.

TECHNICAL FIELD

The present disclosure relates to sensors. The teachings herein may be embodied in a method for programming a sensor network having a plurality of sensors and/or a system for programming a sensor network having a plurality of sensors.

BACKGROUND

Vehicles may contain many sensors arranged as part of a sensor network. Such networks may include multiple sensors having basically the same design, but operated differently depending on use.

SUMMARY

The teachings of the present disclosure may provide a method and/or a system that contribute to a sensor network being programmed efficiently.

Some embodiments may include a method for programming a sensor network having a plurality of sensors (20 to 28), in which a first association (Z1) between a first parameter and a second parameter is provided, wherein the first parameter is representative of a sensor identification and the second parameter is representative of an installation location and/or a system function of the respective sensor (20 to 28), a second association (Z2) is provided between the second parameter and a third parameter, which is representative of prescribed operating data for the respective sensor (20 to 28), the first association (Z1) and the second association (Z2) are taken as a basis for ascertaining a third association (Z3) between the first parameter and the third parameter, and the third association (Z3) is taken as a basis for performing programming for the plurality of sensors (20 to 28) with the respective third parameter.

In some embodiments, the sensor network is a peripheral sensor interface 5, PSI 5, sensor network.

In some embodiments, the first parameter comprises a serial number and/or a type part number.

In some embodiments, the third parameter comprises a sensor start time.

In some embodiments, the third parameter comprises a channel number.

In some embodiments, the first association (Z1) is taken as a basis for storing the second parameter in the respective sensor from the plurality of sensors (20 to 28).

Some embodiments may include a system (1) having an apparatus (10) having a data memory (13), wherein the apparatus (10) is designed to perform a method as described above.

Some embodiments may include an external database (40), wherein the first association (Z1) is provided by the external database (40) and the second association (Z2) is provided by the data memory (13).

Some embodiments may include an external database (40), wherein the first association (Z1) and the second association (Z2) are provided by the external database (40).

BRIEF DESCRIPTION OF THE DRAWINGS

Exemplary embodiments of the invention are explained in more detail below with reference to the schematic drawings, in which.

DETAILED DESCRIPTION

Figure 1:
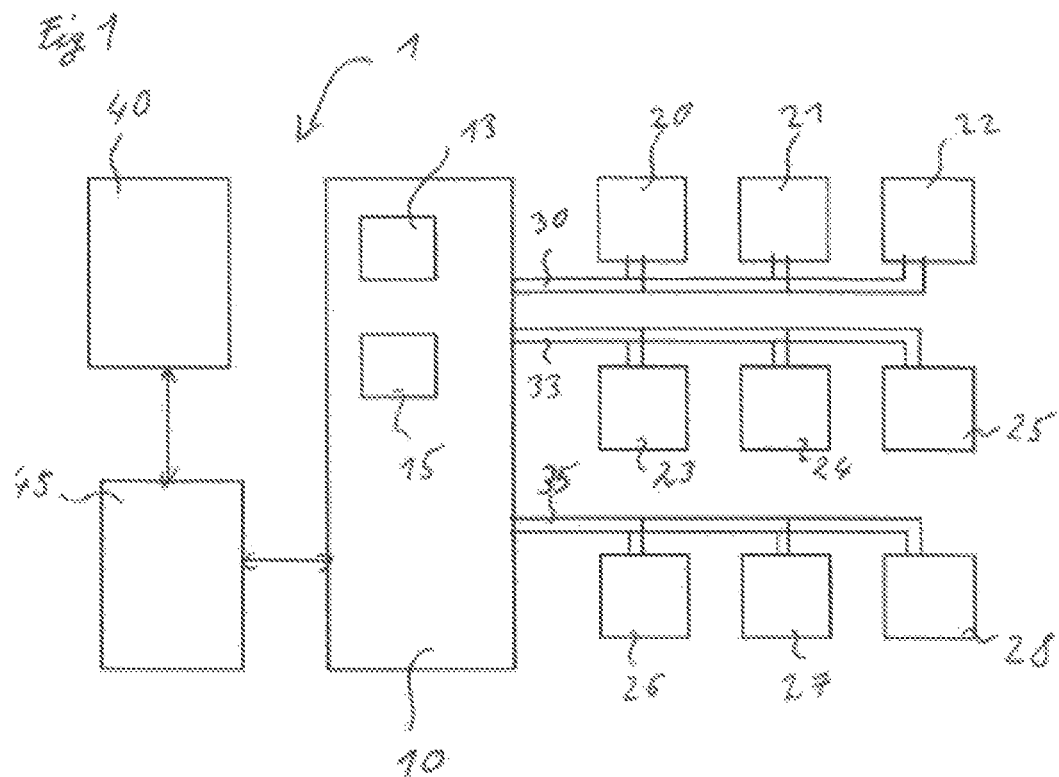
FIG. 1 shows a system for programming a sensor network.

The teaching of the present disclosure may be embodied in a method for programming a sensor network having a plurality of sensors. A first association between a first parameter and a second parameter is provided. The first parameter is representative of a sensor identification, and the second parameter is representative of an installation location and/or a system function of the respective sensor. A second association is provided between the second parameter and a third parameter that is representative of prescribed operating data for the respective sensor. The first association and the second association are taken as a basis for ascertaining a third association between the first parameter and the third parameter. The third association is taken as a basis for performing programming for the plurality of sensors with the respective third parameter.

The first parameter can be used to univocally identify each sensor of the sensor network, for example.

Programming on the basis of the third association allows the sensor network to be programmed very effectively. By way of example, it is thus possible for sensors having basically the same design that are installed at different points in the vehicle to be programmed differently following installation. Hence, it is not necessary to program each sensor prior to actual installation. This additionally allows the sensors to be able to be reprogrammed during operation of the sensor network without their needing to be removed.

In some embodiments, the sensor network is a vehicle sensor network. In some embodiments, the sensor network is a peripheral sensor interface 5 (PSI 5) sensor network. PSI 5 is an open standard and is based on a two wire line and is used in automobile electronics to connect relocated sensors to electronic controllers.

In the case of a PSI 5 sensor network, the use of sensors of the same design may be susceptible to error, since a PSI5 sensor network has no provision for collision detection, for example. The programming for the plurality of sensors allows sensors having the same design to be operated in the PSI5 sensor network, since the programming allows data collisions to be avoided should the situation arise.

In some embodiments, the first parameter comprises a serial number and/or a type part number. The type part number represents the series and/or the type of the respective sensor, for example. The serial number is a univocal serial number for each sensor of a respective type, for example.

In some embodiments, the third parameter comprises a sensor start time. In this context, the sensor start time is a time offset in relation to a synchronization pulse, for example, at which sensor start time the respective sensor begins its data transmission. If the sensor start time is 75 μs, for example, then the respective sensor begins its data transmission 75 μs after the synchronization pulse. This can prevent data collisions from occurring, for example. Alternatively or additionally, the third parameter comprises other operating data, such as characteristic data, for example, such as value ranges, characteristic curves and the like.

In some embodiments, the third parameter comprises a channel number. The sensor network comprises multiple channels, for example. The channel number is therefore representative of the channel on which the respective sensor is meant to transmit its data.

In some embodiments, the first association is a basis for storing the second parameter in the respective sensor from the plurality of sensors. This means that, even after the respective sensor has been removed, for example, the respective sensor can be used to check where the respective sensor was installed and/or what system function it had.

Some embodiments may include an apparatus having a data memory, wherein the apparatus is designed to perform a method as described above.

Some embodiments may include an external database, and the first association is provided by the external database, and the second association is provided by the data memory of the apparatus.

In some embodiments, the system has an external database, and the first association and the second association are provided by the external database. If the first association and the second association are provided by the external database, then it is also possible, by way of example, for the third association to be ascertained, for example externally, and to be stored in the external database for later use of the third association, for example for later programming of the sensor network.

FIG. 1 shows a system 1. The system 1 has an apparatus 10 including a computation unit 15 and a data memory 13. The data memory 13 may store programs, for example. The apparatus 10 comprises one or more sensor network interfaces, for example, that connect it to a sensor network having a plurality of sensors 20 to 28. By way of example, the respective sensors 20 to 28 may be connected to the apparatus 10 via multiple channels, for example via a first channel 30, a second channel 33 and a third channel 35.

In some embodiments, the sensor network is a vehicle network, for example, particularly a PSI5 sensor network. By way of example, the plurality of sensors 20 to 28 comprise temperature sensors and/or pressure sensors and/or oil pressure sensors and/or position sensors and/or acceleration sensors.

In some embodiments, the apparatus 10 may also be coupled to an external database 40 via an interface 45, such as, by way of example, a diagnosis interface, for example by means of a diagnosis connector, for the purpose of communication with the external database 40.

Figure 2:
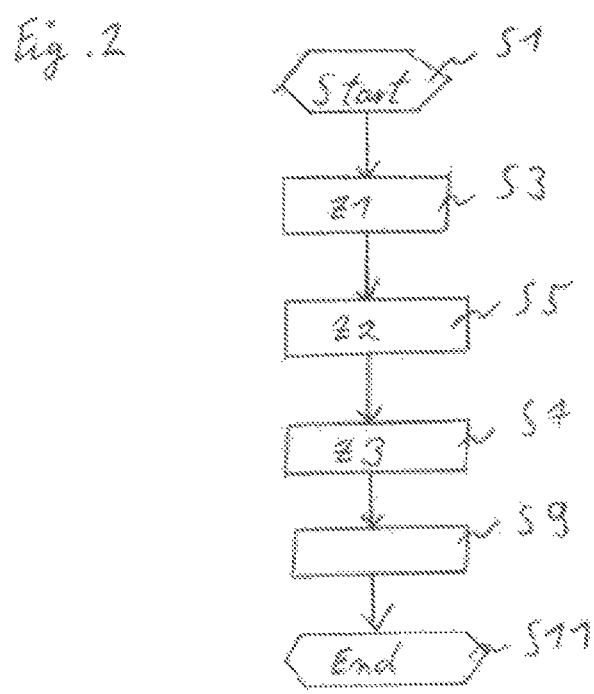
FIG. 2 shows a flowchart for programming the sensor network.

The data memory 13 may store a program executed by means of the computation unit 15 of the apparatus 10 and that is explained in more detail below with reference to the flowchart of FIG. 2.

The program is started in a step S1, in which variables can be initialized if need be.

In a step S3, a first association Z1 between a first parameter and a second parameter may be provided. The first parameter is representative of a sensor identification. The second parameter is representative of an installation location and/or a system function of the respective sensor 20 to 28. By way of example, the first association Z1 is stored in the external database 40 and is provided by the external database 40 by means of the interface 45.

In some embodiments, the first parameter comprises a serial number and/or a type part number. In some embodiments, the first parameter is stored on the respective sensor 20 to 28 by means of a DataMatrix code and is read and stored in the first association Z1 when the respective sensor 20 to 28 is installed, for example.

Table 1 shows the first association Z1 by way of example. The first association Z1 can also be referred to as an installation database. In this case, MAF/Temp-Bank1 represents an air mass meter and temperature sensor for a cylinder bank, for example, T1 represents a prescribed temperature sensor, for example in the exhaust system, T2 represents a further prescribed temperature sensor, for example in the exhaust system, EGR-Pos Bank 1 and EGR-Pos Bank 2 represent sensors in the exhaust gas recirculation system for different cylinder banks.

TABLE 1

Installation database

| System function/installation location | Type part number | Serial number |
| --- | --- | --- |
| MAF/Temp-Bank1 | MFI82 | 1256368 |
| T1 | T26A1 | 222221 |
| T2 | T26A1 | 222222 |
| EGR-Pos Bank 2 | A23C5 | 1111111 |
| EGR-Pos Bank 1 | A23C5 | 1111112 |

In a step S5, a second association Z2 may be provided between the second parameter and a third parameter that is representative of prescribed operating data for the respective sensor 20 to 28. The second association Z2 is provided by the data memory 13 or by the external database 40, for example.

In some embodiments, the third parameter comprises a sensor start time and/or other operating data, such as characteristic data, for example, such as value ranges, characteristic curves and the like. The third parameter additionally comprises a channel number, for example.

Table 2 shows the second association Z2 by way of example, said association also being able to be referred to as a system design matrix.

TABLE 2

System design matrix

| System function/installation location | PSI5 Interface/channel | Start time |
| --- | --- | --- |
| MAF-Bank1 | 1 | 75 μs |
| Temp MAF-Bank1 | 1 | 275 μs |
| T1 | 2 | 300 μs |
| T2 | 2 | 500 μs |
| EGR-Pos Bank 2 | 2 | 75 μs |
| EGR-Pos Bank 1 | 3 | 75 μs |

In a step S7, the first association Z1 and the second association Z2 are taken as a basis for ascertaining a third association Z3 between the first parameter and the third parameter.

In some embodiments, the temperature sensor with the serial number 222221 and/or with the type part number T26A1 is thus assigned a start time of 300 μs and the channel 2, and the temperature sensor with the serial number 222222 and/or with the type part number T26A1 is assigned a start time of 500 µs and the channel 2.

In a step S9, the third association Z3 is taken as a basis for performing programming for the plurality of sensors 20 to 28 with the respective third parameter.

In some embodiments, the temperature sensor with the serial number 222221 and/or with the type part number T26A1 is thus programmed with the start time of 300 µs and the channel 2, and the temperature sensor with the serial number 222222 and/or with the type part number T26A1 is programmed with the start time of 500 µs and the channel 2.

Additionally, the first association Z1 can also be taken as a basis for storing the second parameter in the respective sensor 20 to 28 and its plurality of sensors 20 to 28.

In a step S11, the program is terminated and can be started again in step S1 if need be.

Steps S3-S7 can also be performed separately in another program, for example if the first association Z1 and the second association Z2 are stored in the external database 40.

Prior to programming, the plurality of sensors 20 to 28 are in a quiescent mode, for example, in which the respective sensors 20 to 28 send no data, and, after programming, are put into an active mode, in which the respective sensors 20 to 28 send data. In some embodiments, successful programming of a respective sensor 20 to 28 is confirmed by the setting of an activation flag, for example, and only if the activation flag is set is the respective sensor 20 to 28 put into the active mode, and is able to be put into the quiescent mode again at any time, in order to perform fresh programming or reprogramming if need be, by virtue of the activation flag being reset.

The approach shown allows the sensor network to be programmed very effectively. In some embodiments, it is possible for sensors of basically the same design installed at different points in a vehicle to be programmed differently following installation. This allows minimization of part numbers and connector variants, since the respective sensors 20 to 28 are programmed only after installation. Additionally, it allows development and parts qualification costs to be lowered and incorrect installation to be minimized, since the respective sensors 20 to 28 are programmed only after installation. Additionally, reprogramming requires no additional hardware.

What is claimed is:

1. A method for an electronic controller to connect with various sensors in a sensor network having a plurality of sensors, the method comprising:
    reading a first parameter and a second parameter from an individual sensor in the plurality of sensors, wherein the first parameter represents a sensor identification and the second parameter represents an installation location or a system function of the respective sensor;
    accessing a first association between the first parameter and the second parameter from an external database;
    determining a second association between the second parameter and a third parameter representing prescribed operating data for the respective sensor from the external database or from an internal memory of the electronic controller;
    ascertaining a third association between the first parameter and the third parameter on the basis of the first association and the second association;
    programming the plurality of sensors on the basis of the third association; and
    activating the plurality of sensors once programmed for use in the sensor network.

2. The method as claimed in claim 1, wherein the sensor network is a peripheral sensor interface 5 (PSI5) sensor network.

3. The method as claimed in claim 1, wherein the first parameter comprises a serial number or a type part number.

4. The method as claimed in claim 1, wherein the third parameter comprises a sensor start time.

5. The method as claimed in claim 1, wherein the third parameter comprises a channel number.

6. The method as claimed in claim 1, further comprising storing the second parameter in the respective sensor on the basis of the first association.

7. A system comprising:
    a plurality of sensors;
    an electronic controller; and
    a data memory;
    wherein the electronic controller is programmed to:
    read a first parameter and a second parameter from an individual sensor in the plurality of sensors, wherein the first parameter represents a sensor identification and the second parameter represents an installation location or a system function of the respective sensor;
    access a first association between the first parameter and the second parameter from the data memory;
    determine a second association between the second parameter and a third parameter representing prescribed operating data for the respective sensor;
    ascertain a third association on the basis of the first association and the second association, the third association between the first parameter and the third parameter, and
    program the plurality of sensors on the basis of the third association;
    activate the plurality of sensors once programmed for use in the sensor network.

8. The system as claimed in claim 7, further comprising:
an external database providing the first association; and
the data memory provides the second association.

9. The system as claimed in claim 7, further comprising an external database providing the first association and the second association.

* * * * *